United States Patent
Vijayrao et al.

(10) Patent No.: US 10,896,128 B2
(45) Date of Patent: Jan. 19, 2021

(54) PARTITIONING SHARED CACHES

(71) Applicant: Facebook, Inc., Menlo Park, CA (US)

(72) Inventors: Narsing Vijayrao, Santa Clara, CA (US); Keith Adams, San Carlos, CA (US)

(73) Assignee: Facebook, Inc., Menlo Park, CA (US)

( * ) Notice: Subject to any disclaimer, the term of this patent is extended or adjusted under 35 U.S.C. 154(b) by 271 days.

(21) Appl. No.: 15/390,403

(22) Filed: Dec. 23, 2016

(65) Prior Publication Data

US 2017/0109279 A1    Apr. 20, 2017

Related U.S. Application Data

(63) Continuation of application No. 14/040,330, filed on Sep. 27, 2013, now Pat. No. 9,569,360.

(51) Int. Cl.
| | | |
|---|---|---|
| *G06F 12/08* | (2016.01) | |
| *G06F 12/0811* | (2016.01) | |
| *G06F 12/084* | (2016.01) | |
| *G06F 12/0846* | (2016.01) | |
| *G06F 12/0842* | (2016.01) | |
| *G06F 12/121* | (2016.01) | |
| *G06F 12/12* | (2016.01) | |

(52) U.S. Cl.
CPC ........ *G06F 12/0811* (2013.01); *G06F 12/084* (2013.01); *G06F 12/0842* (2013.01); *G06F 12/0848* (2013.01); *G06F 12/121* (2013.01); *G06F 12/12* (2013.01); *G06F 2212/1024* (2013.01); *G06F 2212/282* (2013.01); *G06F 2212/604* (2013.01); *G06F 2212/6042* (2013.01)

(58) Field of Classification Search
CPC .............. G06F 12/0811; G06F 12/084; G06F 12/0842; G06F 12/0848
See application file for complete search history.

(56) References Cited

U.S. PATENT DOCUMENTS

| | | | |
|---|---|---|---|
| 6,138,209 A | 10/2000 | Krolak et al. | |
| 6,662,272 B2 | 12/2003 | Olarig et al. | |
| 7,133,975 B1 | 11/2006 | Isaac et al. | |
| 7,984,246 B1 * | 7/2011 | Yung ................. | G06F 12/084 |
| | | | 711/147 |
| 8,095,736 B2 | 1/2012 | Rossi | |

(Continued)

OTHER PUBLICATIONS

Advisory Action dated Feb. 25, 2016 for U.S. Appl. No. 14/040,330 of Vijayrao, N., et al., filed Sep. 27, 2013.

(Continued)

*Primary Examiner* — William B Partridge
*Assistant Examiner* — Eric T Loonan
(74) *Attorney, Agent, or Firm* — FisherBroyles, LLP (57) ABSTRACT

Technology is provided for partitioning a shared unified cache in a multi-processor computer system. The technology can receive a request to allocate a portion of a shared unified cache memory for storing only executable instructions, partition the cache memory into multiple partitions, and allocate one of the partitions for storing only executable instructions. The technology can further determine the size of the portion of the cache memory to be allocated for storing only executable instructions as a function of the size of the multi-processor's L1 instruction cache and the number of cores in the multi-processor.

18 Claims, 8 Drawing Sheets

(56) References Cited

U.S. PATENT DOCUMENTS

| | | | |
|---|---|---|---|
| 8,145,844 B2* | 3/2012 | Bruce | G06F 12/0817 |
| | | | 711/120 |
| 2004/0215889 A1 | 10/2004 | Cargnoni et al. | |
| 2006/0036810 A1 | 2/2006 | Accapadi et al. | |
| 2006/0179230 A1 | 8/2006 | Fields et al. | |
| 2006/0224838 A1* | 10/2006 | Blumrich | G06F 12/0822 |
| | | | 711/146 |
| 2009/0106495 A1* | 4/2009 | Chou | G06F 9/3004 |
| | | | 711/130 |
| 2012/0042127 A1 | 2/2012 | Donley et al. | |
| 2012/0054442 A1* | 3/2012 | Walker | G06F 12/0802 |
| | | | 711/128 |
| 2012/0151232 A1 | 6/2012 | Fish, III | |
| 2015/0095577 A1 | 4/2015 | Adams Keith et al. | |

OTHER PUBLICATIONS

Final Office Action dated Oct. 14, 2015 for U.S. Appl. No. 14/040,330 of Vijayrao, N., et al., filed Sep. 27, 2013.

Non-Final Office Action dated Jul. 17, 2015 for U.S. Appl. No. 14/040,330 of Vijayrao, N., et al., filed Sep. 27, 2013.

Notice of Allowance dated Sep. 30, 2016 for U.S. Appl. No. 14/040,330 of Vijayrao, N., et al., filed Sep. 27, 2013.

U.S. Appl. No. 14/040,330 of Vijayrao, N., et al., filed Sep. 27, 2013.

* cited by examiner

PARTITIONING SHARED CACHES

CROSS-REFERENCE TO RELATED APPLICATIONS

This application is a continuation application of U.S. patent application Ser. No. 14/040,330, filed on Sep. 27, 2013 (now U.S. Pat. No. 9,569,360, issued Feb. 14, 2017), entitled "PARTITIONING SHARED CACHES", which is incorporated herein by reference in its entirety.

TECHNICAL FIELD

This patent application generally relates to computer memory management, and more specifically to efficiently managing a shared unified cache in a multi-processor computer system, e.g., to reduce cache thrashing.

BACKGROUND

Computer processors (e.g., central processing units or "CPUs") commonly employ CPU caches to reduce the average time to access memory. Typically, caches are smaller and faster than main system memory. Caches are commonly used by a CPUs to temporarily store copies of data and instructions that were recently read or perhaps might be repeatedly accessed by the processor. Before a CPU accesses (e.g., reads or writes) data in the main system memory, it first checks for a corresponding entry in a cache. If an entry exists in the cache, a "cache hit" is said to occur and the CPU can simply access the cached data. If the entry does not exist in the cache, a "cache miss" is said to occur and the CPU typically waits for a "cache line" to be copied from the main system memory to the cache. A cache line is typically a known or fixed length of bytes. When the cache is full and a cache miss occurs, an eviction policy is used to replace some previously cached data with a new cache line that satisfies the CPU's access. As an example, a least recently used (LRU) eviction policy may evict cached information that has not been recently accessed Caches speed up performance by helping the processor avoid the longer step of loading the values from a main memory device, e.g., a main system memory, which is typically much slower than cache memory. Caches are referred to as "on-board" or "on-chip" when they are integrally packaged with the processor cores, e.g., on a single integrated chip. Many computer systems include additional caches, such as a level 2 (L2) cache and level 3 (L3) cache, which may support on-board (level 1/L1) instruction and data caches. For example, the CPU may first check the L1 cache, and then the L2 cache, and then the L3 cache, before finally resorting to the main system memory. Each cache level is typically progressively larger and slower than the previous level. The larger cache in the additional (L2 or L3) caches is also generally referred to as the last level cache ("LLC") or "shared cache." The additional caches act as an intermediary between the main (system) memory and the on-board caches, and can store a much larger amount of information than the on-board caches, but at a longer access penalty.

Further, in multi-processor computer systems, the additional caches are sometimes shared between two or more processors (also referred to as "cores") in the computer system. For example, in some multi-processor computer systems, two or more processors may share a single L3 cache while each processor maintains a separate L1 cache. Having two or more processors share a cache may be beneficial in various instances. For example, when multiple processors commonly require instructions or data, only one processor fetches the instructions or data into the shared cache and the other processors can then copy the instructions or data into their respective L1 caches.

The L1 cache generally includes a separate instruction cache ($L_{1i}$) for storing executable instructions and a separate data cache ($L_{1d}$) for storing data, allowing the processors to access both instructions and associated data simultaneously (i.e., during the same clock cycle) for executing a given instruction. On the other hand, as the additional cache (or "shared cache") acts as a backup for the L1 cache, the computer systems commonly use the additional cache to store both the executable instructions and the data within the same unified cache (as opposed to separate caches for data and instructions) to optimize for memory utilization of the additional cache. However, such a cache architecture can suffer from performance degradation due to high cache thrashing.

Cache thrashing can occur when a cache is loaded with instructions or data, the loaded information is then evicted, and then the cache is loaded again with new instructions or data. For example, when an application retrieves a lot of data, instructions in the L2 and L3 cache may be evicted to load cache lines containing data because the instructions corresponding to the application may be accessed from the L2 or L3 cache may be accessed much less frequently than data, e.g., because the processor has cached the instructions in the instruction portion of the L1 cache.

When multiple processors of a multi-processor architecture process the same instructions (e.g., execute the same application), cache thrashing can be particularly problematic, e.g., because different cores may need to retrieve the same instructions, but the instructions needed by one core have been evicted from a shared cache to load data accessed by other cores. Performance degradation can be caused by cache thrashing because the processor has to wait ("stalls") until an evicted instruction is re-fetched from the main memory. Cache thrashing can considerably slow down the performance of a computing system because a processor has to continually move instructions or data in and out of the cache instead of executing application instructions.

Conventional techniques reduce cache thrashing by increasing the cache size, increasing cache-associativity, having a victim cache, and so on. However, these techniques come with concomitant overhead, e.g., extra hardware costs, increased cache hit access time, etc. Another conventional technique identifies frequently executed instructions after code-profiling and locks the cache through software to minimize cache thrashing. However, this technique requires additional overheads in terms of requiring profiling of code and extra instructions in the code to lock the cache.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 1 is a block diagram illustrating a brief, general description of a representative environment in which the various embodiments can be implemented in.

FIG. 2 is a block diagram illustrating a data processing system with a multi-level cache hierarchy, in which the various embodiments may be implemented in.

The headings provided herein are for convenience only and do not necessarily affect the scope or meaning of the claimed embodiments. Further, The drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Overview

Embodiments are disclosed for partitioning a shared unified cache in a multi-processor computer system. In various embodiments, a shared unified cache is partitioned into multiple partitions, wherein each partition includes one or more cache lines. The cache lines included within a given partition are not included in the other partitions. In various embodiments, one of the partitions is allocated for storing only executable instructions but not data, where the one or more cache lines associated with the allocated partition are utilized for only accessing (e.g., writing or reading) executable instructions.

In various embodiments, the size of the partition of the shared cache allocated for storing only executable instructions is equal to the product of the size of the multi-processor's L1 instruction cache ($L_{1i}$) and the number of cores in the multi-processor. In various embodiments, the other partitions are allocated for storing only data. By partitioning the shared unified cache in this manner, data can be evicted independently of instructions, allowing recently used instructions to more likely remain cached even when the instructions may be less recently used than the cached data. This reduces cache thrashing considerably as still needed executable instructions are less likely to be evicted than would be the case in a unified cache architecture.

General Description

Various examples of the techniques introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Figure 1:
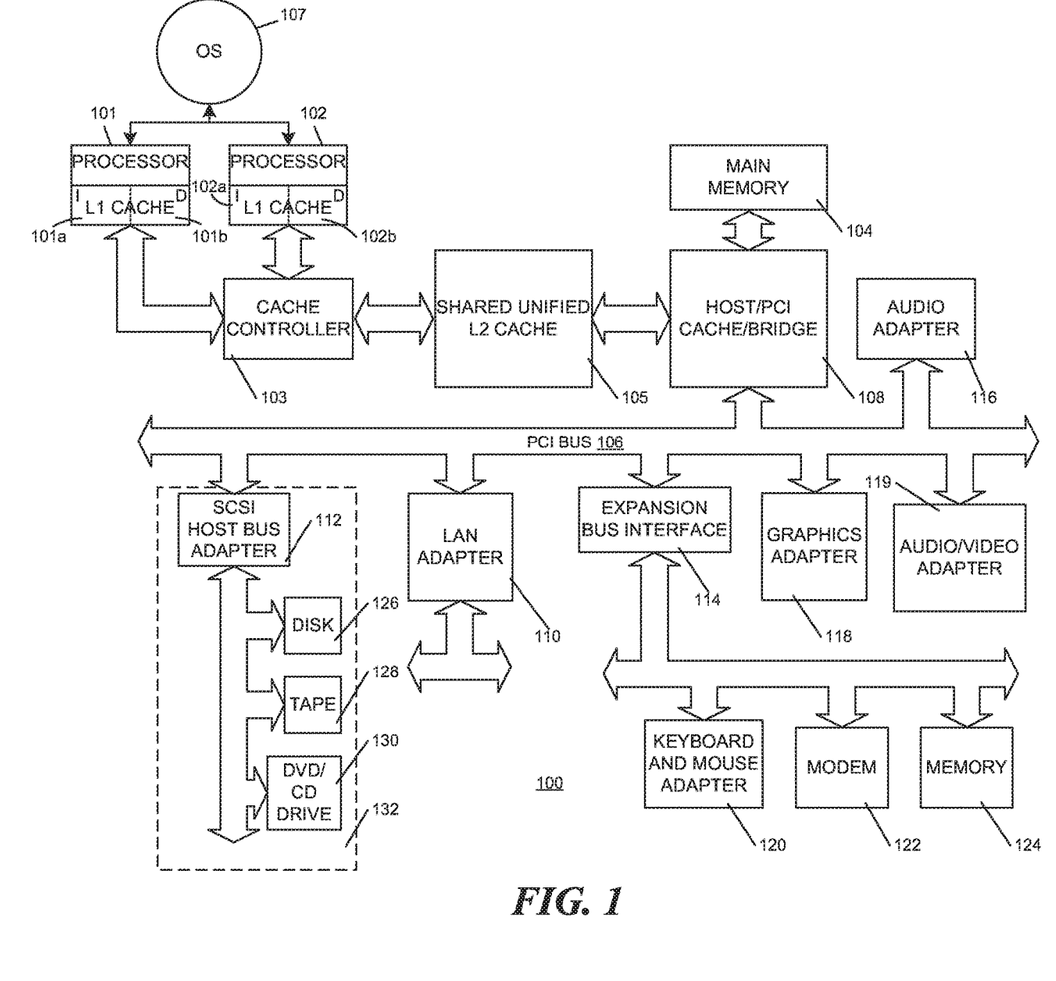

Turning now to the Figures, FIG. 1 is a block diagram illustrating a data processing system 100 in which the various embodiments may be implemented in. The data processing system 100 employs a multi-processor computing unit (e.g., CPU) containing processor cores 101 and 102 and peripheral component interconnect (PCI) local bus architecture. In this particular configuration, each processor core includes a processor and an L1 cache, where the L1 cache consists of an sole instruction cache 101a, 102a and an sole data cache 101b, 102b. Further, the two processor cores share a unified L2 cache 105 and a cache controller 103 controls the two processor cores' access (e.g., to read and write data) to the shared unified L2 cache 105.

In some embodiments, the cache controller 103 further partitions the shared unified L2 cache 105 and controls the access to the various partitions. A cache is said to be "unified" if the cache can be used to store executable instructions or data in any given cache block (a basic unit of storage in cache), which is also referred to as a cache line. Further, the term "unified", as used to describe a cache, does not describe or imply a physical characteristic of a given cache. A "unified" cache memory can include a single physical memory device or could include multiple physical memory devices. The L2 cache in the data processing system 100 constitutes a Last Level Cache ("LLC") that acts as an intermediary between the main (system) memory 104 and previous caches, e.g., the L1 caches. However, it should be understood that other configurations are possible in various embodiments. As an example, an L3 cache (not illustrated) may instead be an LLC that acts as an intermediary between the main memory 104 and an L2 cache.

Figure 2:
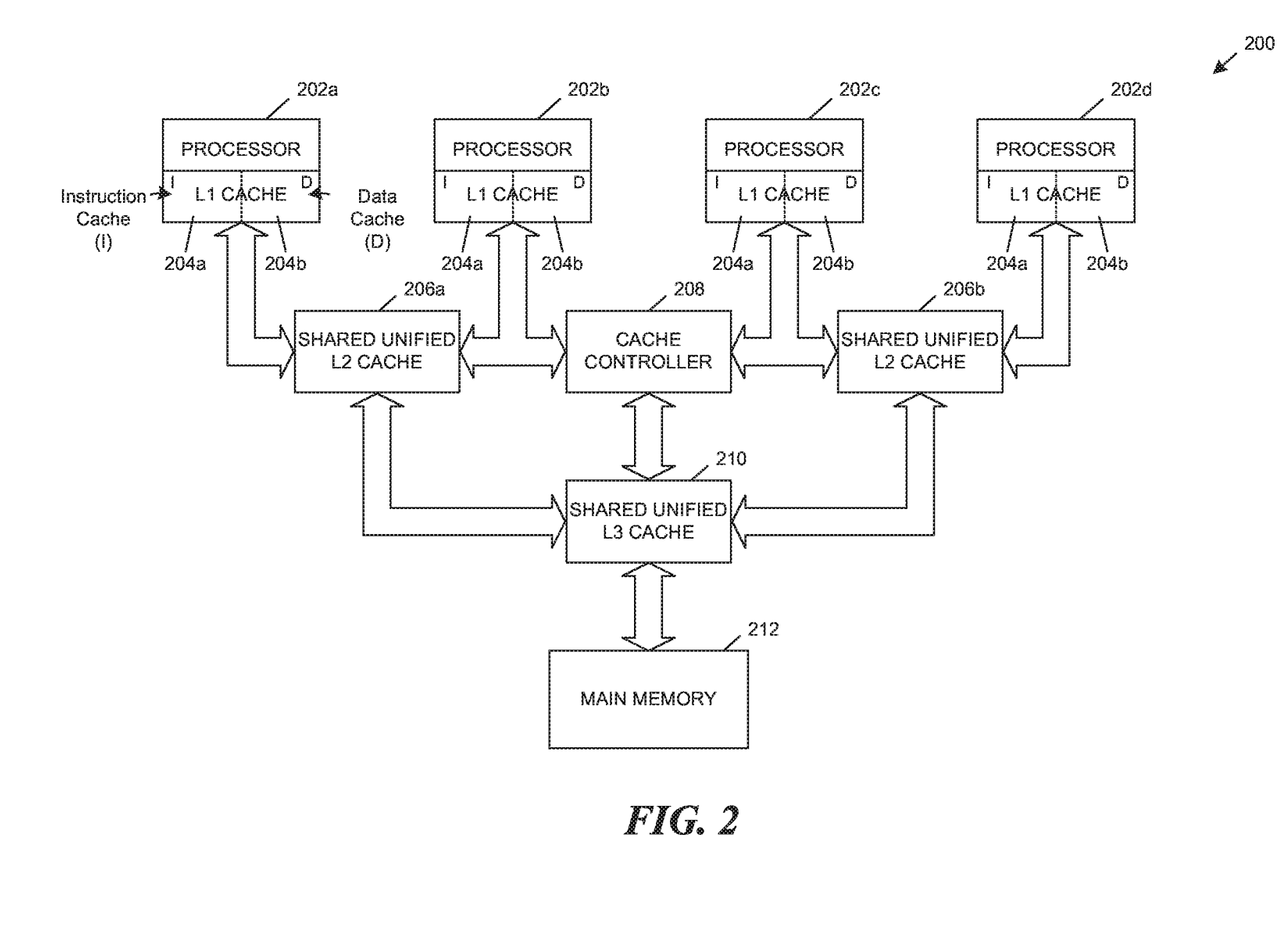

Other configurations, such as that illustrated in FIG. 2, may be used as well. FIG. 2 is a block diagram illustrating a data processing system 200 with a multi-level cache hierarchy, in which the various embodiments may be implemented in. In the illustrated system 200, each of two unified L2 caches 206a and 206b is shared by two processors (202a and 202b; or 202c and 202d) and a unified L3 cache 210 is shared by all processors in the system. Further, the processors 202a-d each include an L1 instruction cache ("I") 204a and an L1 data cache ("D") 204b. In the multi-level cache hierarchy illustrated in FIG. 2, the shared unified L3 cache 210 is an LLC that acts as an intermediary between the main (system) memory 212 and the L1 204a, 204b and L2 206a-d caches. Further, the cache controller 208 controls the processors' 202 access to the L2 206 and L3 210 caches.

Returning to FIG. 1, the L2 cache 105 is connected to main memory 104 and PCI local bus 106 through a PCI bridge 108. PCI bridge 108 also may include an integrated memory controller and additional cache memory for processors 101 and 102. Additional connections to PCI local bus 106 may be made through direct component interconnection or through add-in boards. In the illustrated system, local area network (LAN) adapter 110, SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots.

Expansion bus interface 114 provides a connection for a keyboard and mouse adapter 120, modem 122, and additional memory 124. Small computer system interface (SCSI) host bus adapter 112 provides a connection for hard disk drive 126, tape drive 128, and CD-ROM/DVD drive 130. Typical PCI local bus implementations will support three or four PCI expansion slots or add-in connectors. Note that for purpose of simplification the term "processor" will be used to refer to one or more processor cores on a single integrated circuit die and the term "processors" will be used to refer to two or more processor cores one or more integrated circuit dies. Note further that although the depicted example employs a PCI bus, other bus architectures such as Accelerated Graphics Port (AGP) and Industry Standard Architecture (ISA) may be used.

An operating system ("OS") 107 executes on processors 101 and/or 102 and is used to coordinate and provide control of various components within data processing system 100 in FIG. 1. The OS 107 may be any conventional or special-purpose operating system, e.g., MICROSOFT WINDOWS, LINUX, UNIX, etc. An object oriented programming system (e.g., JAVA) may execute in conjunction with the operating system and provide an application program interface (API) to the operating system for Java programs or applications executing on data processing system 100. Instructions for the operating system, the object-oriented operating system, and applications or programs are located on storage devices, e.g., hard disk drive 126, and may be loaded into main memory 104 for execution by processors 101 and 102.

Those of ordinary skill in the art will appreciate that the hardware in FIG. 1 may vary depending on the implementation. For example, other internal hardware or peripheral devices, such as flash ROM (or equivalent nonvolatile memory) or optical disk drives and the like, may be used in addition to or in place of the hardware illustrated in FIG. 1. Thus, the system illustrated in FIG. 1 and described above are not meant to imply architectural limitations.

Figure 3:
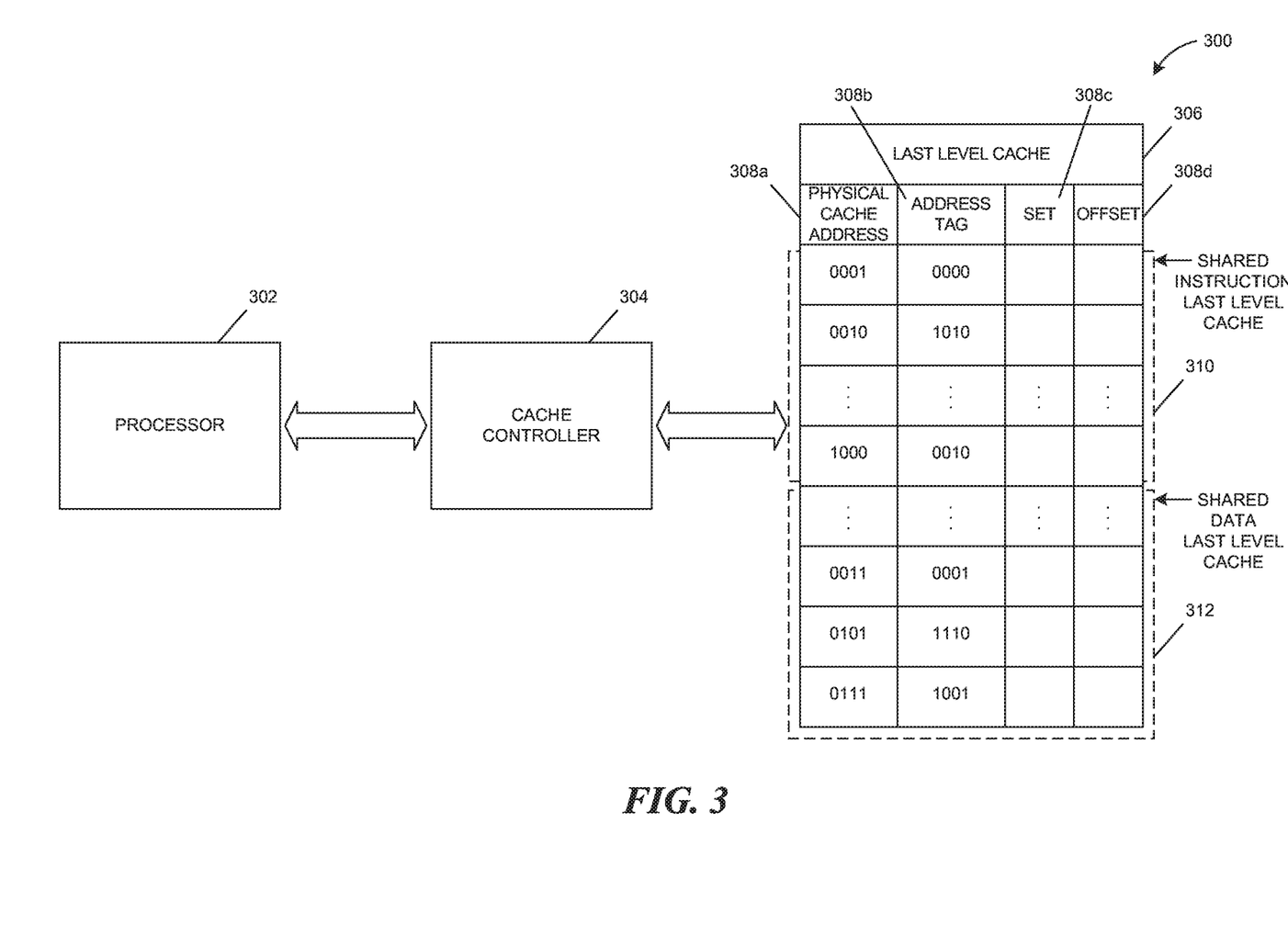
FIG. 3 is a block diagram illustrating a method for partitioning a Last Level Cache ("LLC") in the data processing environment, consistent with various embodiments.

FIG. 3 is a block diagram illustrating a method for partitioning a LLC in the data processing environment 300, consistent with various embodiments. In some embodiments, the processor 302 can be similar to the processor 101, 102 of FIG. 1, the cache controller 304 can be similar to the cache controller 103 of FIG. 1, and the LLC 306 can be similar to the LLC 105 of FIG. 1. In some embodiments, the LLC 306 is partitioned to allocate a portion of the LLC 306 for storing only executable instructions.

In some embodiments, the cache controller 304 performs partitioning of the LLC 306 and controls access to the various partitions of the LLC 306. In some embodiments, the cache controller 304 performs partitioning of the LLC 306 by partitioning the physical cache addresses, each associated with a physical cache location, into one or more partitions. In some embodiments, each partition could include a contiguous portion of physical cache addresses, where the number of physical cache addresses allocated for a given partition is determined based on the size of cache memory allocated for the given partition.

In some embodiments, the physical cache addresses allocated to a given partition includes non-contiguous physical cache addresses. In some embodiments, a proportion of the cache lines within each set of cache lines is allocated to a particular partition, where the physical cache addresses corresponding to the allocated cache lines are used to control access to the partition. In some embodiments, the proportion of the cache lines to allocate within each set is determined based on the ratio of the size of the allocation request for the partition to the overall size of the LLC 306.

In some embodiments, the size of the cache memory to be allocated for a given partition is provided by a user-input, e.g., by setting a value in a model specific register (MSR) in the processor 302 using the System BIOS utilized to boot the processor 302. In general, a model specific register in a processor 302 can used for debugging, computing performance monitoring, toggling certain processor 302 functions, etc. In some embodiments, the cache controller 304 reads the value in a model specific register and utilizes the value to determine whether to partition the LLC 306 and the size of a given partition when the LLC 306 is being partitioned.

In embodiments where the model specific register is utilized to trigger a partitioning, the cache controller 304 partitions the LLC when the processor 302 is booted using the System BIOS. In some embodiments, the model specific register can store a specific value, where the cache controller 304 utilizes the specific value to determine whether to partition the LLC 306 and allocate a portion of the LLC 306 for storing only executable instructions. The model specific register further utilizes the specific value to determine the size of the portion of the LLC 306 to be allocated for storing only executable instructions.

In some embodiments, the model specific register can simply store a single binary value, where one state indicates not to partition the LLC 306 while the other state indicates to partition the LLC 306 to allocate a pre-determined portion of the LLC 306 for storing only executable instructions. In some embodiments, the cache controller 304 determines the pre-determined portion of the LLC 306 for storing only executable instructions as a function of the size of the L1 sole instruction cache 204a and the number of processor cores in the data processing environment 300. In some embodiments, the cache controller 304 determines the pre-determined portion of the LLC 306 for storing only executable instructions to be equal to the sum of the size of the L1 instruction cache 204a of each of the processor cores in the data processing environment 300 (i.e., a product of the number of processor cores and the size of the $L_{1i}$).

In various embodiments, a processor can implement a multiplexor ("mux") that can be employed to exchange data between an L1 cache and a shared/LLC cache or a partition of the cache used to store only instructions or only data, as appropriate. The processor may include a flag bit or line that is set by the basic input output system (BIOS) or the operating system. This flag or line may indicate whether or not to partition the cache in the manner described above. As an example, when fast execution of instructions is desirable, the flag may be set to indicate to partition the shared cache. On the other hand, when fast handling of data is desirable, the flag may be set not to partition the shared cache.

In some embodiments, the cache controller 304 further controls access to each of the partitions. In some embodiments, the cache controller 304 utilizes preset control settings to determine the usage and access restriction of each partition. As discussed above, in some embodiments, the cache controller 304 partitions the LLC 306 to allocate a portion of the LLC 306 for storing only executable instructions. In some embodiments, the cache controller 304 can further impose access restrictions to the unallocated portion of the LLC 306, where the unallocated portion of the LLC 306 can be used to store only data. In some embodiments, the cache controller 304 can allow the unallocated portion of the LLC 306 to be used as a unified cache region, where both data and executable instructions can be stored. Persons skilled in the art will understand and appreciate that the cache controller described herein may be performed by hardware or software, or a combination of both.

In some embodiments, the cache controller 304 working in coordination with the OS 107 kernel controls access to the cache partitions. In various embodiments, the OS kernel implements a cache management policy that helps determine the cache lines to be replaced/evicted when the OS kernel receives a request for allocation of a cache line for storing data/instruction in the cache and the cache is full. The OS kernel chooses the cache line(s) to discard by one of a number of means known to those skilled in the art (least recently used (LRU), random, pseudo-LRU, etc.).

In some embodiments, the OS 107 kernel, working in coordination with the cache controller 304, can choose a cache line to replace/evict based on both the cache management policy and any allocated storage partition within the LLC. For example, when the cache line chosen to discard for storing new data is an executable instruction that is stored within a partition for executable instructions, the OS 107 kernel will pick the cache line that lies within any unallocated portion of LLC or portion of LLC allocated for storing data.

In some embodiments, when the cache controller 304 receives a request to allocate a portion of the LLC 306 for storing only executable instructions, the cache controller 304 partitions a portion of the LLC 306 for storing executable instruction and the remaining portion of the LLC 306 for storing data. The allocated portion of the LLC 306 for storing executable instructions 310 forms a shared instruction LLC 310, where the processors 302 in the data processing environment 300 share the instruction LLC 310 for storing only executable instructions. The allocated portion of the LLC 306 for storing data 312 forms a shared data LLC 312, where the processors 302 in the data processing environment 300 share the data LLC 312 for storing only data.

In some embodiments, the cache controller 304 determines the size of the portion of the LLC 306 to be allocated for storing only executable instructions as a function of the size of the L1 sole instruction cache 204a and the number of processor cores in the data processing environment 300. In some embodiments, the cache controller 304 utilizes the remaining portion of the LLC 306 (i.e., the portion of LLC 306 not allocated for storing only executable instructions) for storing data. In some embodiments, the cache controller 304 determines the portion of the LLC 306 to be allocated for storing only executable instructions to be equal to the sum of the size of the L1 instruction cache 204a of each of the processor cores in the data processing environment 300 (i.e., a product of the number of processor cores and the size of the $L_{1i}$).

Further, the instruction LLC 310 and the data LLC 312 each include one or more cache lines, where executable instructions and data can be stored in, respectively. In some embodiments, the cache controller further maintains a mapping of the physical cache address associated with each cache line and the partition (i.e., instruction LLC 310 or data LLC 312) the cache line is associated with. In addition, the address tag, the set and offset fields in the LLC 306 can be utilized for cache addressing. In cache addressing, the various fields are matched with the address received from the processors 302 in an access request to provide access to the data/instruction stored in the cache line with the match.

Hence, even with a cache management policy that discards cache lines based on LRU policy, the cache controller 304, by partitioning the shared LLC 306 into data and instruction portions, allows recently used instructions to more likely remain cached in the LLC 306 even though the instructions may be less recently used than cached data (as data can now be evicted independently of instructions).

Although the illustrated embodiment partitions the LLC 306 into an instruction-only partition and a data-only partition, in embodiments, the LLC 306 may be partitioned into a third partition that can store both instructions and data, e.g., so that there is a further shared cache, albeit one that is smaller than the overall LLC 306. In some embodiments, the LLC 306 can be partitioned to include a partition for storing only executable instructions and a unified partition for storing both data and executable instructions. In some embodiments, the cache management policy can be configured to distinguish between instances where an executable instruction is being stored in the LLC 306 after being evicted from the $L_{1i}$ cache and other instances (e.g., executable instruction being fetched from the main memory after a cache miss) where instructions are being stored in the LLC 306. Based on the distinction, a particular executable instruction can be stored in any one of the partitions of the LLC 306. In some embodiments, only executable instructions that are being evicted from the $L_{1i}$ cache are stored in the instruction-only partition of the LLC 306. In other instances where executable instructions are being stored in the LLC 306, the instructions are stored in the unified partition of LLC 306 that is utilized for storing both data and executable instructions.

Figure 4:
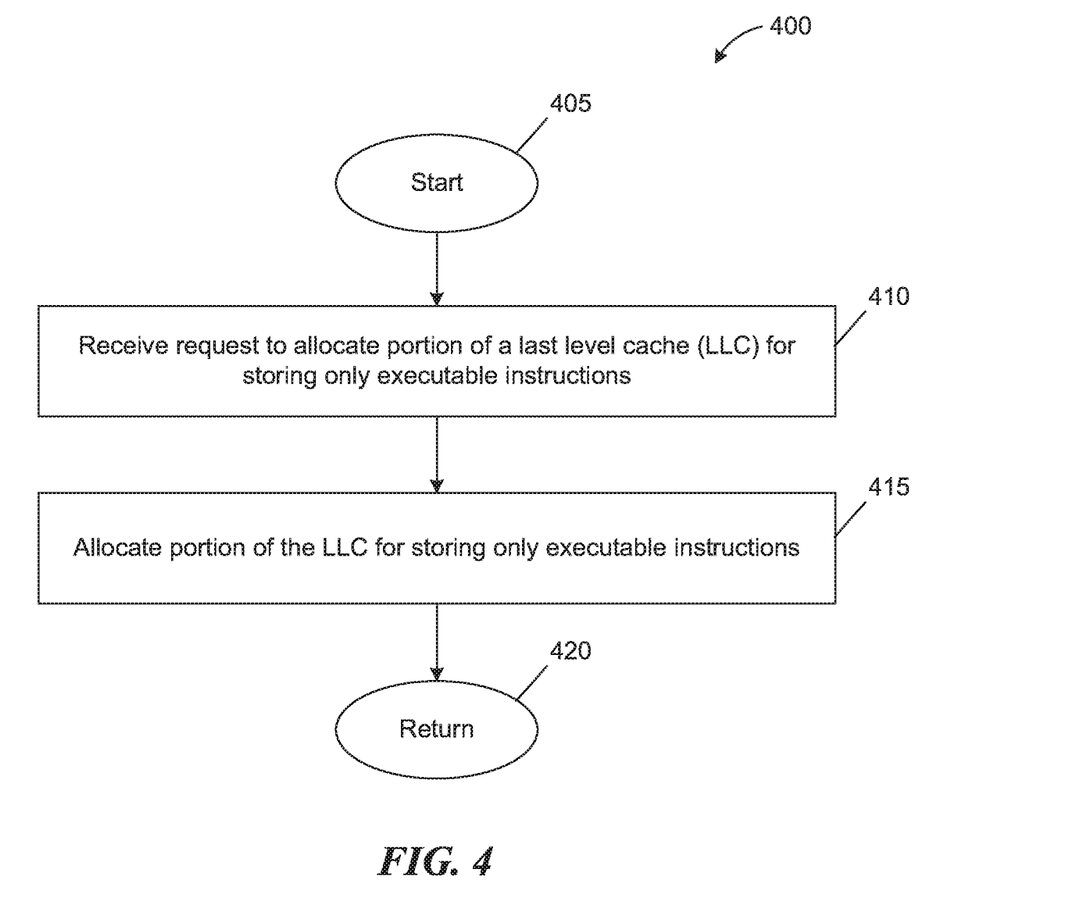
FIG. 4 is a flow diagram illustrating a method for partitioning LLC, consistent with various embodiments.

FIG. 4 is a flow diagram illustrating a method 400 for partitioning LLC 306, consistent with various embodiments. In various embodiments, the method 400 may be executed in a data processing environment, e.g., data processing environment 100 of FIG. 1. The method 400 starts at block 405. At block 410, a request for allocating a portion of a LLC for storing only executable instructions is received. As discussed above, in some embodiments, the request to allocate portion of the LLC for storing only executable instructions is received when the model specific registry is set to a value indicating an allocation request during boot up of the processor.

As discussed above, in some embodiments, at block 410, receiving allocation request includes determining the size of the portion of LLC to be allocated for storing only executable instructions. In some embodiments, the determination is performed by identifying the size value set in the model specific registry. In some embodiments, the size of the portion of LLC to be allocated is determined as a function of a total sum of the size of the L1 instruction cache associated with each of the one or more processors 101, 102.

At block 415, a portion of the LLC for storing only executable instructions is allocated. In some embodiments, the size of the portion of the LLC allocated for storing only executable instructions is equal to the value provided in the received request. In some embodiments, at block 415, a portion of the LLC for storing only executable instructions is allocated by partitioning the physical cache addresses, each associated with a physical cache location, and utilizing the cache lines associated with a portion of the physical cache addresses for storing only executable instructions. In some embodiments, each partition can include a contiguous portion of physical cache addresses, where the number of physical cache addresses allocated for a given partition is determined based on the size of LLC allocated for the given partition. In some embodiments, the physical cache addresses allocated to a given partition includes non-contiguous physical cache addresses.

Those skilled in the art will appreciate that the logic illustrated in FIG. 4 and described above, and in each of the flow diagrams discussed below, may be altered in various ways. For example, the order of the logic may be rearranged, substeps may be performed in parallel, illustrated logic may be omitted, other logic may be included, etc.

Figure 5:
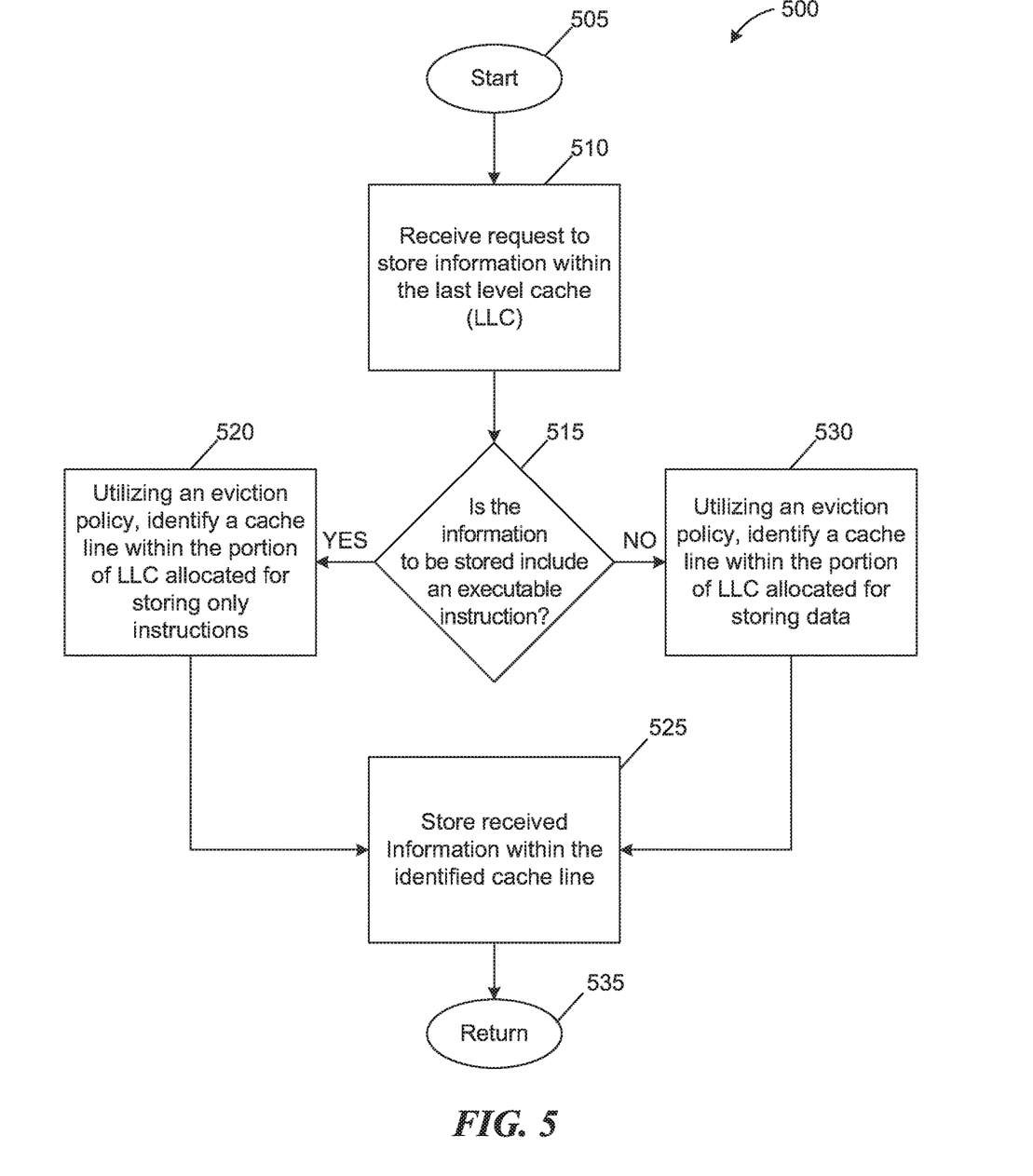
FIG. 5 is a flow diagram illustrating a method for storing data/instruction in a LLC which includes a partition for storing only executable instructions and a partition for storing only data, consistent with various embodiments.

FIG. 5 is a flow diagram illustrating a method 500 for storing data/instructions in a LLC 306 which includes a partition for storing only executable instructions 310 and a partition for storing only data 312, consistent with various embodiments. In various embodiments, the method 500 may be executed in a data processing environment, e.g., data processing environment 100 of FIG. 1. The method 500 starts at block 505. At block 510, a request to store information within the last level cache (LLC) is received, where the stored information could include data or executable instructions. In various embodiments, the received request includes a memory address, associated with the stored information, to be stored (at least partially) in conjunction with the information in the LLC.

At decision block 515, a determination is made as to whether the stored information includes an executable instruction. In some embodiments, the determination is made by evaluating an indicator bit set by the processor to indicate the type of information being stored, where one binary state indicates an executable instruction and the other indicates a data. If the stored information is determined to include executable instruction, at block 520, utilizing an eviction policy, a cache line within the portion of LLC allocated for storing only instruction is identified for storing the executable instruction.

The cache line to discard can be chosen by one of a number of means known to those skilled in the art (least recently used (LRU), random, pseudo-LRU, etc.). In various embodiments, when a cache line within the portion of LLC allocated for storing only instructions is empty (i.e., not storing valid data), the eviction policy picks the empty cache line for storing the received information before choosing cache lines with valid information for eviction.

If the stored information is determined to include data, at block 530, utilizing an eviction policy, a cache line within the portion of LLC allocated for storing only data is identified for storing the data. As discussed above, the cache line to discard can be chosen by one of a number of means known to those skilled in the art (least recently used (LRU), random, pseudo-LRU, etc.). In block 525, the received information is stored within the identified cache line. In various embodiments, the portion of the address associated with the received information is stored in the identified cache line as address tag 308, while the remaining portion of the address is used to index to identify the appropriate set and offset to store the received information in. The method returns at block 535.

Figure 6:
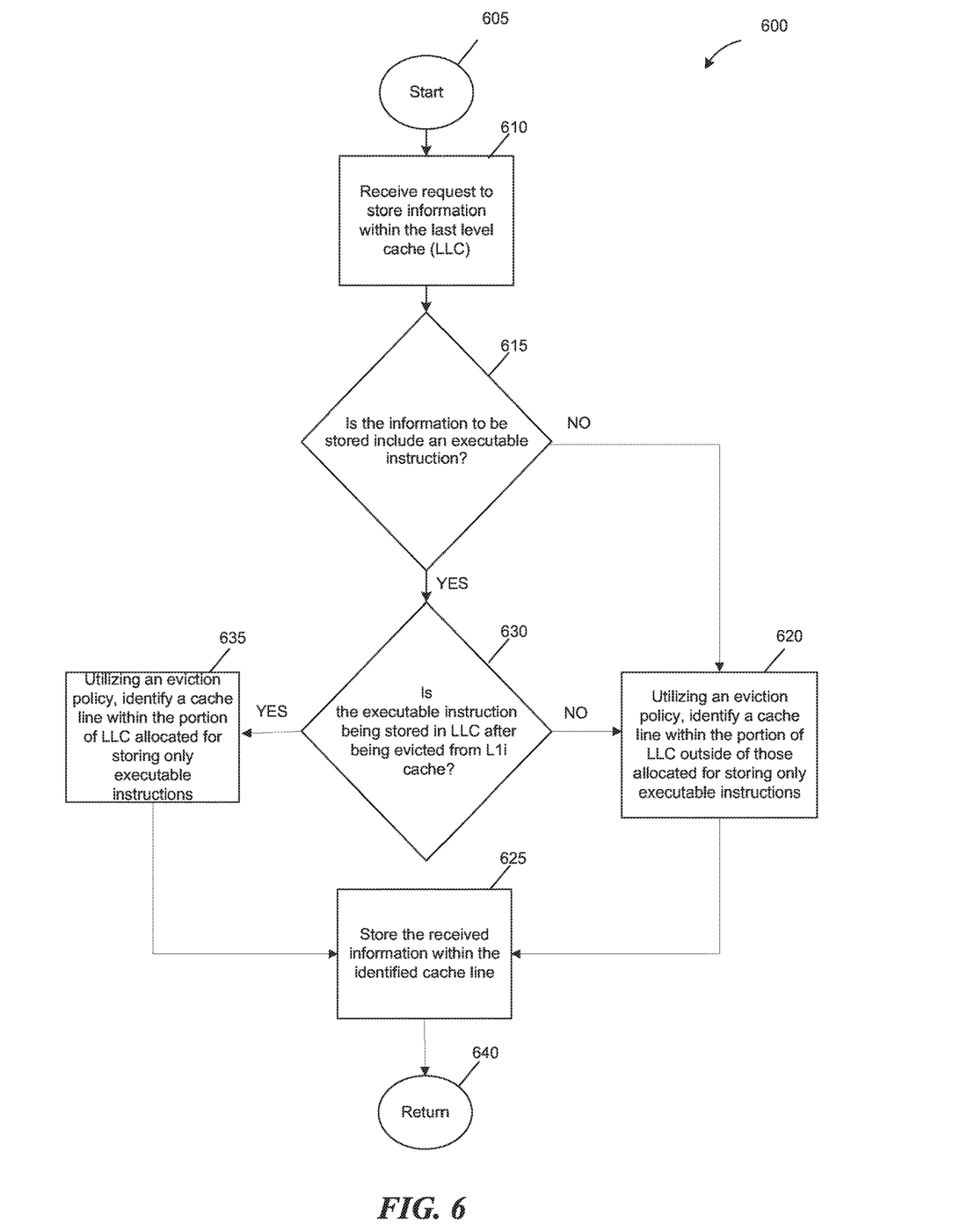
FIG. 6 is a flow diagram illustrating a method for storing data/instruction in a unified LLC which includes a partition for storing only executable instructions and a unified partition for storing both data and instructions, consistent with various embodiments.

FIG. 6 is a flow diagram illustrating a method 600 for storing data/instruction in a unified LLC 306 which includes a partition for storing only executable instructions 310 and a unified partition for storing both data and instructions, consistent with various embodiments. In various embodiments, the method 600 may be executed in a data processing environment, e.g., data processing environment 100 of FIG. 1. The method 600 starts at block 605. At block 610, a request to store information within the LLC is received, where the stored information can include a data or an executable instruction. At decision block 615, a determination is made as to whether the stored information includes an executable instruction. In some embodiments, the determination is made by evaluating an indicator bit set by the processor to indicate the type of information being stored, where one binary state indicates an executable instruction and the other indicates a data.

If the stored information is determined to include data, at block 620, utilizing an eviction policy, a cache line within the portion of LLC outside of those allocated for storing only executable instructions is identified for storing the data. As discussed above, the cache line to discard can be chosen by one of a number of means known to those skilled in the art (least recently used (LRU), random, pseudo-LRU, etc.). In block 625, the received information is stored within the identified cache line. In various embodiments, the portion of the address associated with the received information is stored in the identified cache line as address tag 308, while the remaining portion of the address is used to index to identify the appropriate set and offset to store the received information in.

If the stored information is determined to be an executable instruction, at decision block 630, a determination is made as to whether the executable instruction is being stored within the LLC after being evicted from the $L_{1i}$ cache. As discussed above, a request to store a particular executable instruction within the LLC can be triggered either by the eviction of the particular executable instruction from the $L_{1i}$ cache or from the fetching of the particular executable instruction from the main memory due to a cache miss (i.e., the particular executable instruction not being stored in the cache hierarchy when requested by the processor) or a prefetch operation.

If the executable instruction is being stored in the LLC after being evicted from the $L_{1i}$ cache, at block 635, utilizing an eviction policy, a cache line within the portion of the LLC allocated for storing only executable instructions is identified for storing the executable instruction. As discussed above, the cache line to discard can be chosen by one of a number of means known to those skilled in the art (least recently used (LRU), random, pseudo-LRU, etc.). However, if the executable instruction is being stored in the LLC after being fetched (or prefetched) from the main memory, the control returns to block 620, where a cache line within the portion of the LLC outside of those allocated for storing only executable instructions is identified for storing the executable instruction. In some embodiments, if the executable instruction is being stored in the LLC after being fetched (or prefetched) from the main memory, a cache line within the portion of the LLC allocated for storing only executable instructions is identified for storing the executable instruction. The method returns at block 640.

Figure 7:
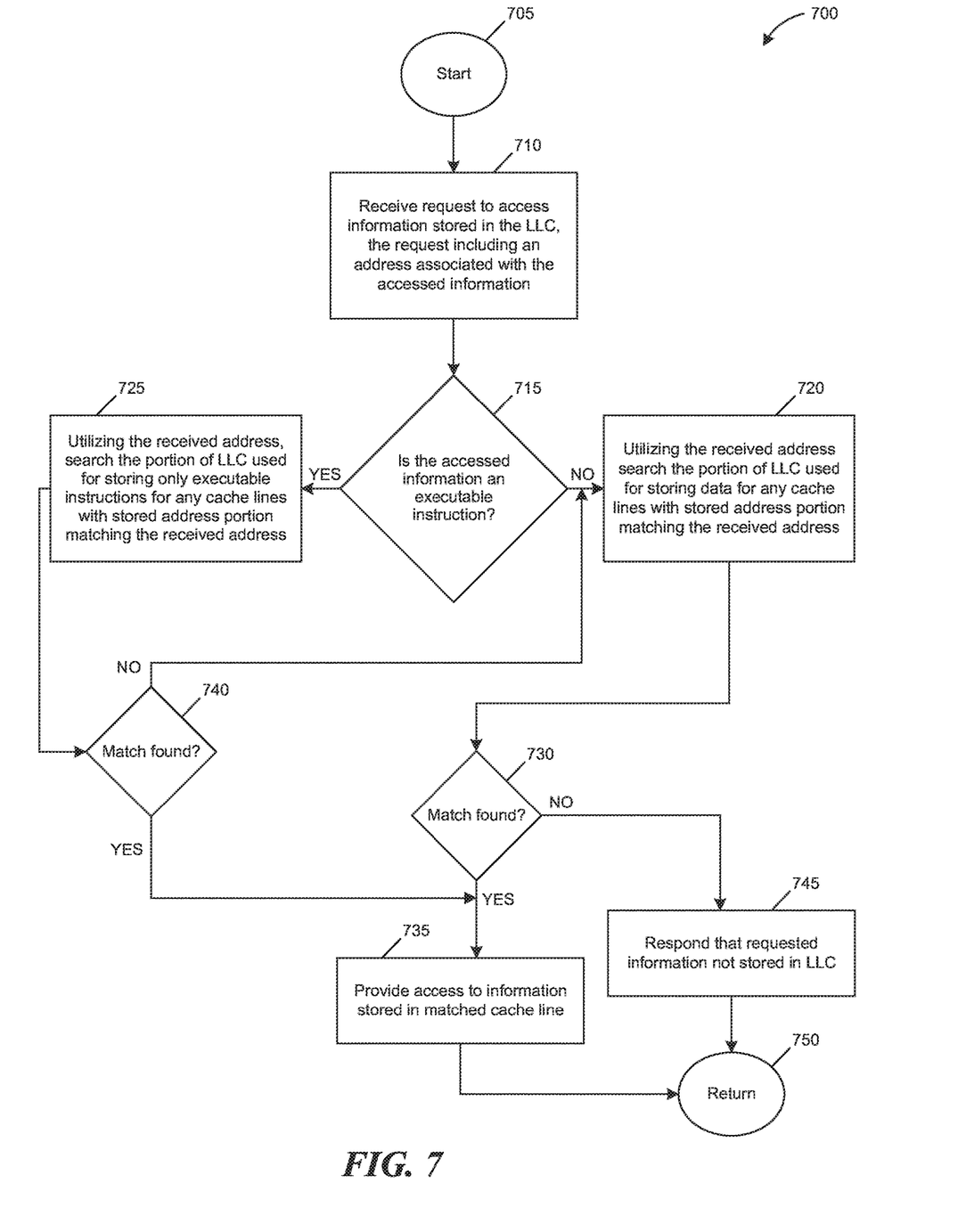
FIG. 7 is a flow diagram illustrating a method for accessing data/instruction stored in a unified LLC which includes a partition for storing only executable instructions and a unified partition for storing both data and instructions, consistent with various embodiments.

FIG. 7 is a flow diagram illustrating a method 700 for accessing data/instruction stored in a unified LLC 306 which includes a partition for storing only executable instructions 310 and a unified partition for storing both data and instructions, consistent with various embodiments. In various embodiments, the method 700 may be executed in a data processing environment, e.g., data processing environment 100 of FIG. 1. The method 700 starts at block 705. At block 710, a request to access information possibly stored within the LLC 306 is received, where the access request includes a memory address associated with the accessed information.

At decision block 715, a determination is made as to whether the information being accessed includes an executable instruction. In some embodiments, the determination is made by evaluating an indicator bit set by the processor to indicate the type of information being accessed, where one binary state indicates an executable instruction and the other indicates a data. If the accessed information is determined to include executable instruction, at block 725, utilizing the received memory address, search the portion of the cache lines within the LLC allocated for storing only executable instructions.

Using cache addressing, a portion of the received memory address is utilized to identify an appropriate set within which another portion of the received memory is matched against the address tag 308 stored in the cache lines. The remaining portion of the address is used to index to identify the appropriate offset to access the stored information in the event of a match between the tag 308 and the received memory address. At decision block 740, a determination is made whether a match between the received memory address and the address tag stored in the cache lines associated with the LLC allocated for storing only executable instructions.

If it is determined that a match was found at block 740, at block 735, access to the executable instruction stored in the matched cache line is provided. If it is determined that a match was not found, in a LLC partitioned into a sole portion for executable instruction 310 and a sole portion for data 312, at block 745, a response indicating that the requested information was not stored in LLC is provided. In some embodiments, at block 745, a request to retrieve the requested information associated with the received memory address is issued to the main memory.

If it is determined that a match was not found, at block 735, in a LLC partitioned into a sole portion for executable instruction 310 and a remaining unified portion for storing both data and instruction, at block 745, the control returns to block 720. Returning to block 715, if the accessed information is determined to include data, at block 720, utilizing the received memory address, search the portion of the cache lines outside the portion of LLC allocated for storing only executable instructions.

Using cache addressing, a portion of the received memory address is utilized to identify an appropriate set within which another portion of the received memory is matched against the address tag 308 stored in the cache lines. The remaining portion of the address is used to index to identify the appropriate offset to access the stored information in the event of a match between the tag 308 and the received memory address. At decision block 730, a determination is made as to whether a match between the received memory address and the address tag stored in the cache lines associated with the LLC outside those allocated for storing only executable instructions. If it is determined that a match was found at block 730, at block 735, access to the information stored in the matched cache line is provided. If it is determined that a match was not found, at block 745, a response indicating that the requested information was not stored in LLC is provided. The method returns at block 750.

Figure 8:
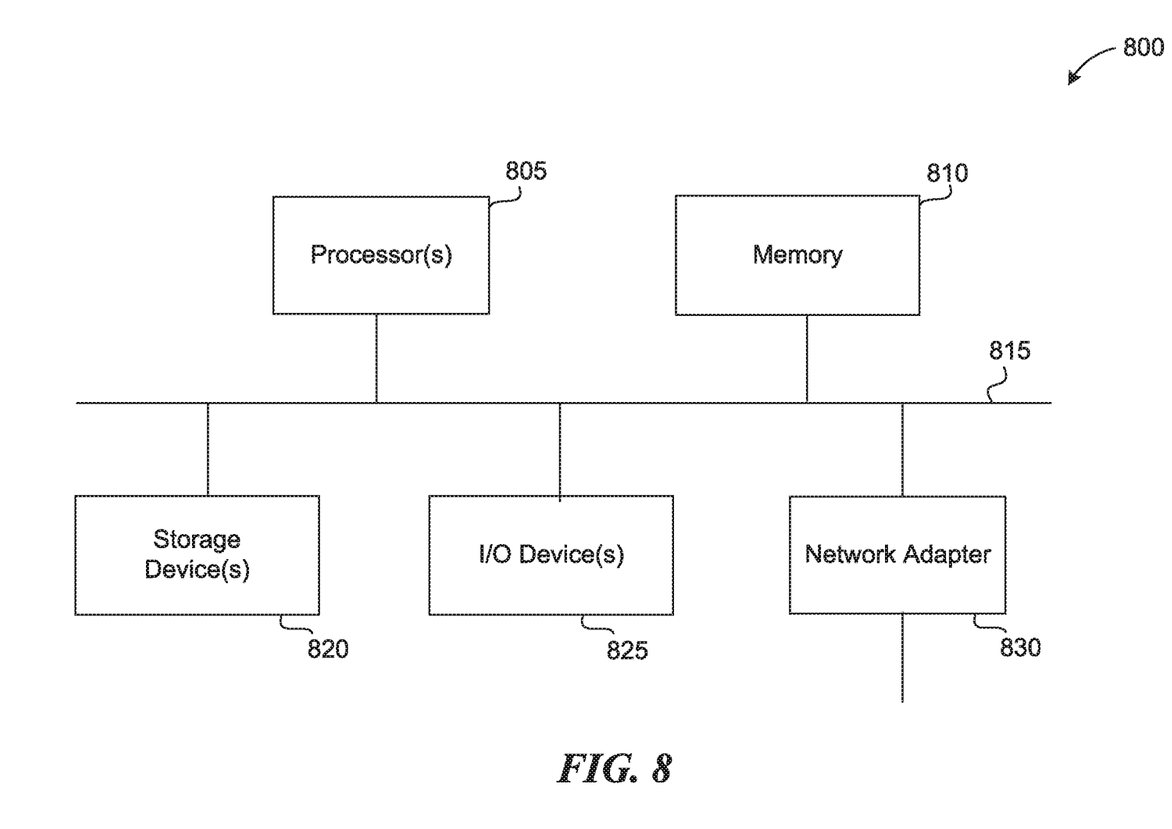
FIG. 8 is a block diagram of a computer system as may be used to implement features of some of the embodiments.

FIG. 8 is a block diagram of a computer system as may be used to implement features of some of the embodiments. The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 810 and storage devices 820 are computer-readable storage media that may store instructions that implement at least portions of the various embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 830).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A computer-implemented method, comprising:
   storing, by a cache controller of a computing system, multiple executable instructions and data in a shared cache memory, the shared cache memory shared between multiple processors of the computing system, wherein the shared cache memory includes:
      a first partition that is restricted to storing the executable instructions, wherein the first partition is generated by:
         receiving a request to allocate a portion of the shared cache memory to the first partition,
         determining a size of the portion as a function of a total sum of a memory size of an instruction cache associated with each of the multiple processors, and
         partitioning the shared cache memory to generate the first partition; and
      a second partition that is outside of the first partition and is configured as a unified partition in which any of the data or the executable instructions is stored;
   receiving, by the cache controller, a request to store a first executable instruction in the shared cache memory;
   determining, by the cache controller, whether the first executable instruction was evicted from a higher-level cache memory;
   responsive to a determination that the first executable instruction was evicted from a higher-level cache memory, selecting, by the cache controller and based on a cache management policy, a first cache line located in the first partition to store the first executable instruction in; and
   responsive to a determination that the first executable instruction was not evicted from a higher-level cache memory, selecting, by the cache controller and based on the cache management policy, a second cache line located in the second partition to store the first executable instruction in.

2. The computer-implemented method of claim 1, wherein the shared cache memory further comprises:
   a third partition that is configured as a partition that is restricted to storing data.

3. The computer-implemented method of claim 1, wherein the higher-level cache memory comprises an instruction cache of one of the multiple processors.

4. The computer-implemented method of claim 1, wherein the first partition and the second partition are associated with distinct cache lines of the shared cache memory.

5. The computer-implemented method of claim 1 further comprising:
   storing a mapping of a physical cache address of a cache line and a specified partition the cache line is associated with.

6. The computer-implemented method of claim 1, wherein a determination that the first executable instruction was not evicted from a higher-level cache memory is in response to the first executable instruction being fetched from a main memory.

7. The computer-implemented method of claim 6, wherein the first executable instruction is fetched from the main memory as a result of a cache miss.

8. The computer-implemented method of claim 6, wherein the first executable instruction is fetched from the main memory as a result of a prefetch operation.

9. A cache controller for a computing system that includes multiple processors and a shared cache memory shared between the multiple processors, wherein the cache controller is configured to:
   allocate a portion of the shared cache memory of a specified size as a first partition of multiple partitions that is restricted to storing executable instructions, wherein the specified size is determined based on a number of the multiple processors and a size of an instruction cache associated with the multiple processors;
   receive a request to store information in the shared cache memory;
   determine whether the information to be stored includes data or an executable instruction;
   determine, in response to determining that the information to be stored includes an executable instruction, whether the executable instruction was evicted from a higher-level cache memory;
   store the information within the first partition of the multiple partitions in an event the information includes an executable instruction that was evicted from a higher-level cache memory; and
   store the information in the shared cache memory in a second partition of the multiple partitions in an event the information includes an executable instruction that was not evicted from a higher-level cache memory, wherein the second partition is configured as a unified partition in which any of the data or the executable instructions is stored.

10. The cache controller of claim 9, wherein the event in which the information includes an executable instruction that was not evicted from a higher-level cache memory comprises an event in which the information includes an executable instruction that was fetched from a main memory.

11. The cache controller of claim 10, wherein the event in which the information includes an executable instruction that was fetched from the main memory occurs as a result of a cache miss.

12. The cache controller of claim 10, wherein the event in which the information includes an executable instruction that was fetched from the main memory occurs as a result of a prefetch operation.

13. The cache controller of claim 9, wherein the information is stored in the second partition or a third partition of the multiple partitions in an event the information includes data, and wherein the third partition is restricted to storing information of type data.

14. A computing system, comprising:
multiple processors;
a shared cache memory shared by the multiple processors; and
a cache controller configured to:
store multiple executable instructions and data in the shared cache memory, wherein an executable instruction is a first type of information and data is a second type of information, wherein the shared cache memory includes:
a first partition that is restricted to storing information of the first type, wherein the first partition is generated by:
receiving a request to allocate a portion of the shared cache memory to the first partition,
determining a size of the portion as a function of a total sum of a memory size of a cache for information of the first type associated with each of the multiple processors, and
partitioning the shared cache memory to generate the first partition; and
a second partition that is outside of the first partition and is configured as a unified partition in which any of the data or the executable instructions is stored;
receive a request to store a first information of the first type in the shared cache memory; and
determine whether the first information of the first type was evicted from a higher-level cache memory;
responsive to a determination that the first information of the first type was evicted from a higher-level cache memory, select, based on a cache management policy, a first cache line located in the first partition to store the first information in; and
responsive to a determination that the first information of the first type was not evicted from a higher-level cache memory, select, based on the cache management policy, a second cache line located in the second partition to store the first information in.

15. The computing system of claim 14, wherein the cache controller is further configured to:
generate a third partition of the shared cache memory, wherein the third partition is restricted to storing information of the second type.

16. The computing system of claim 14, wherein a determination that the first information of the first type was not evicted from a higher-level cache memory is in response to the first information of the first type being fetched from a main memory.

17. The computing system of claim 16, wherein the first information of the first type is fetched from the main memory as a result of a cache miss.

18. The computing system of claim 16, wherein the first information of the first type is fetched from the main memory as a result of a prefetch operation.

* * * * *